(12) United States Patent
Lee et al.

(10) Patent No.: US 7,744,309 B2
(45) Date of Patent: Jun. 29, 2010

(54) HYDRAULIC POWER GENERATING SYSTEM

(76) Inventors: Koo Shik Lee, Shinhyang Villa 9-102, 18-24, Joongkok 4-dong, Kwangjin-ku, Seoul (KR); Dae Hoon Lee, Shinhyang Villa 9-102, 18-24, Joongkok 4-dong, Kwangjin-ku, Seoul (KR)

( * ) Notice: Subject to any disclaimer, the term of this patent is extended or adjusted under 35 U.S.C. 154(b) by 260 days.

(21) Appl. No.: 11/790,312

(22) Filed: Apr. 25, 2007

(65) Prior Publication Data

US 2008/0044229 A1 Feb. 21, 2008

(30) Foreign Application Priority Data

May 4, 2006 (KR) ...................... 10-2006-0040528

(51) Int. Cl.
  *E02B 9/00* (2006.01)
  *F03B 13/12* (2006.01)
(52) U.S. Cl. ................. 405/75; 290/54; 416/7
(58) Field of Classification Search ............ 405/75, 405/76; 290/53, 54; 416/197
  See application file for complete search history.

(56) References Cited

U.S. PATENT DOCUMENTS

| | | | | |
|---|---|---|---|---|
| 825,841 A | * | 7/1906 | Kifer | ........................ 415/5 |
| 3,882,320 A | * | 5/1975 | Schmeller | .................... 290/43 |
| 4,698,516 A | * | 10/1987 | Thompson | .................. 290/54 |
| 5,471,098 A | * | 11/1995 | Asay | ........................... 290/54 |
| 5,684,335 A | * | 11/1997 | Ou | ............................... 290/54 |
| 2005/0147471 A1 | * | 7/2005 | Lee et al. | ..................... 405/75 |
| 2006/0033341 A1 | * | 2/2006 | Kaufman | ..................... 290/54 |
| 2008/0042443 A1 | * | 2/2008 | Mui | ............................ 290/54 |

* cited by examiner

*Primary Examiner*—Tara Mayo-Pinnock
(74) *Attorney, Agent, or Firm*—Bacon & Thomas, PLLC

(57) ABSTRACT

A hydraulic power generating system is disclosed. The hydraulic power generating system includes a looped rail, a plurality of pulleys moving along the looped rail, a plurality of water receiving plates, each being installed to each of the pulleys, side plates which are hingedly coupled to left and right side portions of each of the water receiving plates by hinge shafts, and spread adjusting devices which make the side plates spread against a direction of water flow. Accordingly, since the spread direction of the side plates hingedly coupled to both side portions of the water receiving plate can be changed forward and backward according to the direction of water flow so as to receive a larger amount of water, efficiency in generating power using water energy increases.

1 Claim, 5 Drawing Sheets

HYDRAULIC POWER GENERATING SYSTEM

BACKGROUND OF THE INVENTION

1. Field of the Invention

The present invention relates to a hydraulic power generating system that is equipped with a plurality of water receiving plates mounted on a looped rail, and more particularly to an improvement of Korean Patent Registration No. 534546 that had been filed by this inventor.

2. Description of the Related Art

A conventional hydraulic power generating system disclosed in Korean Patent Registration No. 534546 includes a looped rail, a plurality of pulleys moving along the looped rail, a plurality of wings, each of which is installed to each of the pulleys, and a generator to generate electricity after receiving kinetic energy from the pulleys.

Each of the wings includes at least one circumferential wall and a water reception plate movably attached to the circumferential wall, and is configured to move in a state wherein water naturally flowing is kept in a space defined in the wing by the circumferential wall.

However, the wings of the conventional hydraulic power generating system as structured above have the defect of a low water receiving effect.

SUMMARY OF THE INVENTION

Therefore, the present invention has been made in view of the above problems, and it is an object of the present invention to provide a hydraulic power generating system that is equipped with side plates hingedly coupled to both side portions of a water receiving plate, whose spread direction can be changed (preferably, at a spread angle of 20 to 70 degrees) forward and backward according to a direction of water flow so as to receive a larger amount of water, thereby increasing the efficiency in generating power using water energy.

In accordance with an aspect of the present invention, the above and other objects can be accomplished by the provision of a hydraulic power generating system including a looped rail, a plurality of pulleys moving along the looped rail, and a plurality of water receiving plates, each being installed to each of the pulleys, comprising: side plates which are hingedly coupled to left and right side portions of each of the water receiving plates by hinge shafts; and spread adjusting devices which make the side plates spread against a direction of water flow.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
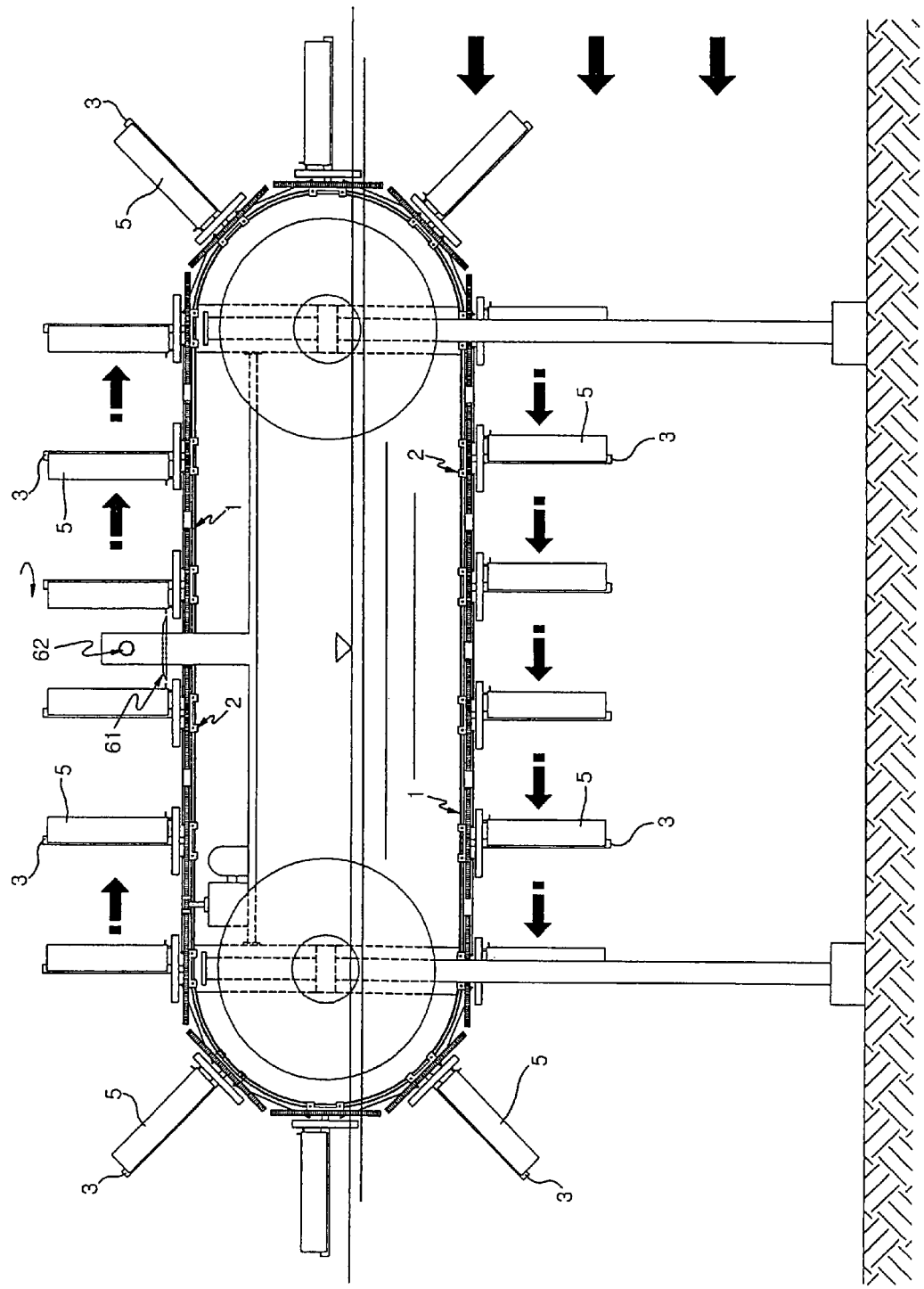
FIG. 1 is a side view illustrating a hydraulic power generating system in accordance with an exemplary embodiment of the present invention.

Now, preferred embodiments of the present invention will be described in detail with reference to the annexed drawings.

A hydraulic power generating system according to the present invention includes a looped rail 1, a plurality of pulleys 2 moving along the looped rail 1, and a plurality of water receiving plates 3, each of which is installed to each of the pulleys 2, to move the pulley by absorbing flow energy of water. Side plates 4 and 5 are hingedly coupled to left and right side portions of each of the water receiving plates 3 by hinge shafts 41 and 51. The hydraulic power generating system further includes spread adjusting devices which make the side plates 4 and 5 spread against the direction of water flow. It is desirable that an spread angle C of each of the side plates 4 and 5 with respect to a line perpendicular to each of the water receiving plates 3 is in the range of 20 to 70 degrees (more preferably, 30 to 45 degrees).

Referring to FIGS. 1 to 4, a first embodiment of the spread adjusting device includes a lock releasing part 61 for releasing the locking state of locking devices 42 and 52 mounted to the side plates 4 and 5, and a side plate rotating part 62 which rotates the side plates 4 and 5 to spread against the direction of water flow.

The locking devices 42 and 52 respectively include stoppers 422 and 522 which are mounted to the respective side plates 4 and 5 and elastically supported by springs 421 and 521, and insertion holes 21 formed at the pulley 2.

The lock releasing part 61 of the spread adjusting device includes a guide bar 611 formed at each of the stoppers 422 and 522, and a guide rail 612 mounted to a fixing frame (not shown).

The side plate rotating part 62 of the spread adjusting device includes a push bar 621 mounted to the fixing frame and elastically supported by a spring.

Figure 5:
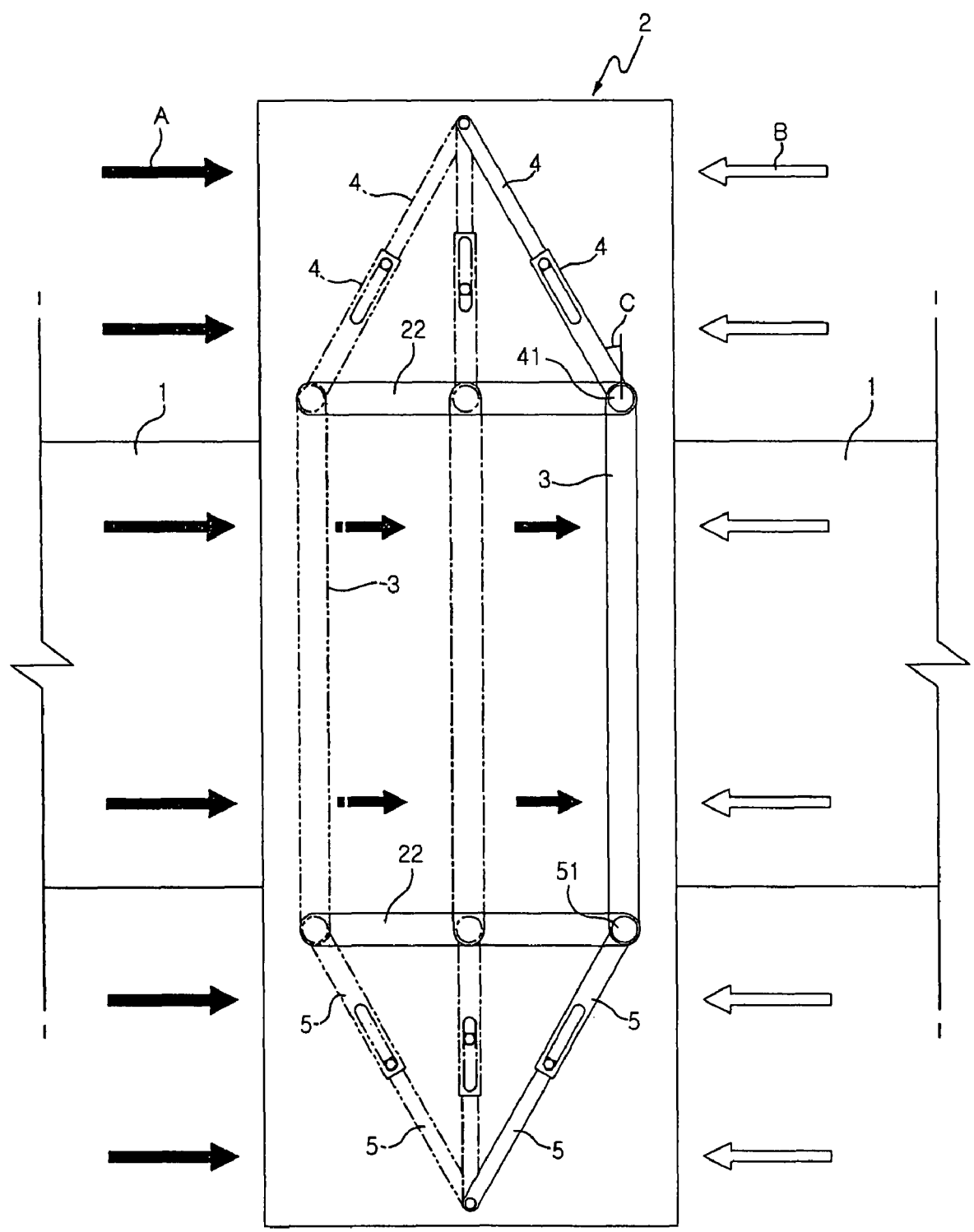
FIG. 5 is a plan view illustrating a hydraulic power generating system in accordance with another exemplary embodiment of the present invention.

Referring to FIG. 5, a second embodiment of the spread adjusting device is configured such that rails 22 are formed on the pulley 2, the left and right ends of the water receiving part 3 are mounted onto the rails 22 to move therealong, and the side plates 4 and 5 hingedly coupled to the left and right side portions of the water receiving plate 3 by the hinge shafts 41 and 51 are axially mounted to the pulley 2 at their front ends. Accordingly, the water receiving plate 3 can move freely forward and backward along the rails 22 according to the direction of water flow. However, if the lengths of the side plates 4 and 5 that are hingedly coupled to the left and right side portions of the water receiving plate 3 and axially mounted to the pulley at their front ends are not changed, the water receiving plate 3 cannot move forward and backward along the rails 22. From this point of view, each of the side plates 4 and 5 includes two separate pieces and a connecting portion which connects two separate pieces so that one piece can move relatively to the other piece to change the whole length of each of the side plates 4 and 5. Preferably, one piece is insertedly connected to the other piece.

Figure 2:
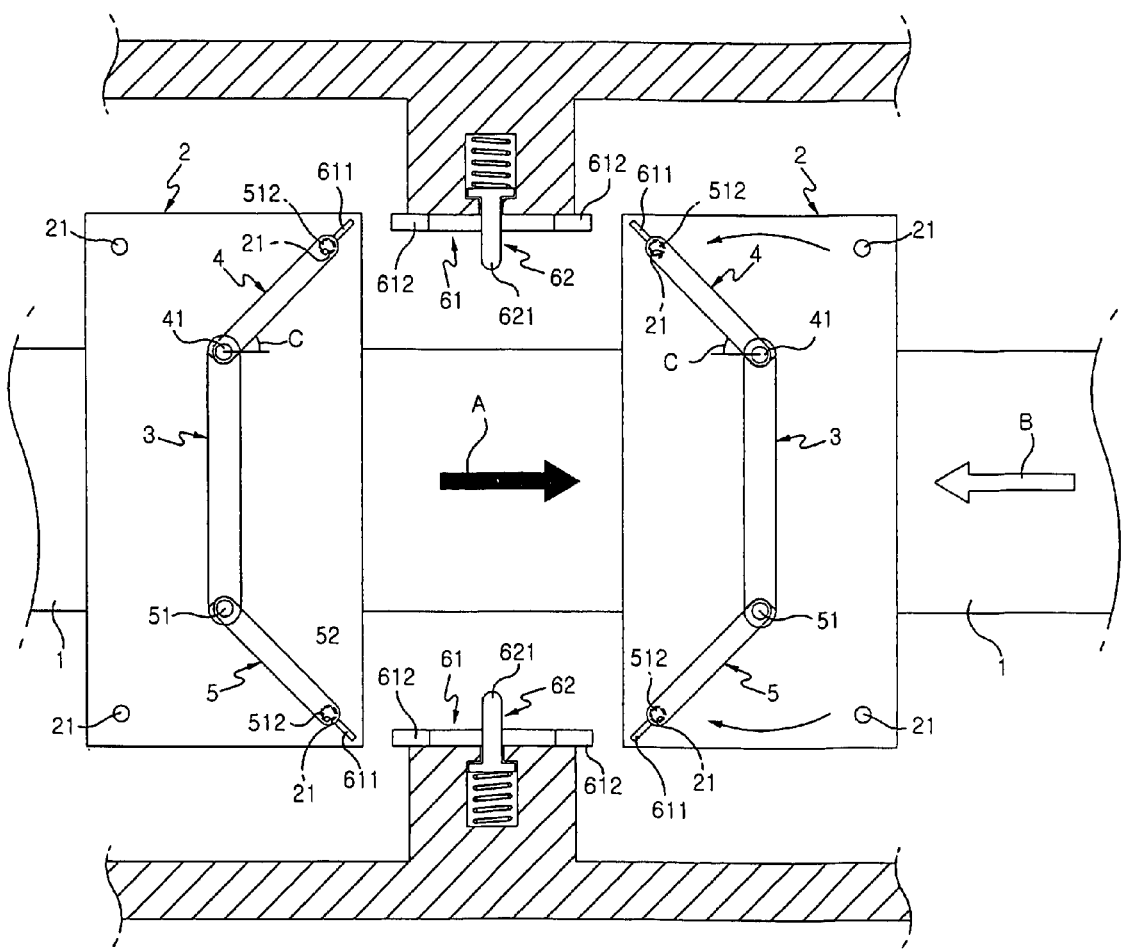
FIG. 2 is a plan view illustrating the hydraulic power generating system in accordance with an exemplary embodiment of the present invention.

As shown in FIG. 2, when water flows in the arrow "A" direction, the water receiving plates 3 and the side plates 4 and 5, which spread in the left and right directions from the respective water receiving plates 3 by a certain spread angle, receive water. And, when the water receiving plates 3 and the side plates 4 and 5 are subjected to resistance of water flowing in nature, the pulleys 2 with the water receiving plates 3 and the side plates 4 and 5 start to move along the looped rail 1, thereby generating electricity.

Figure 3:
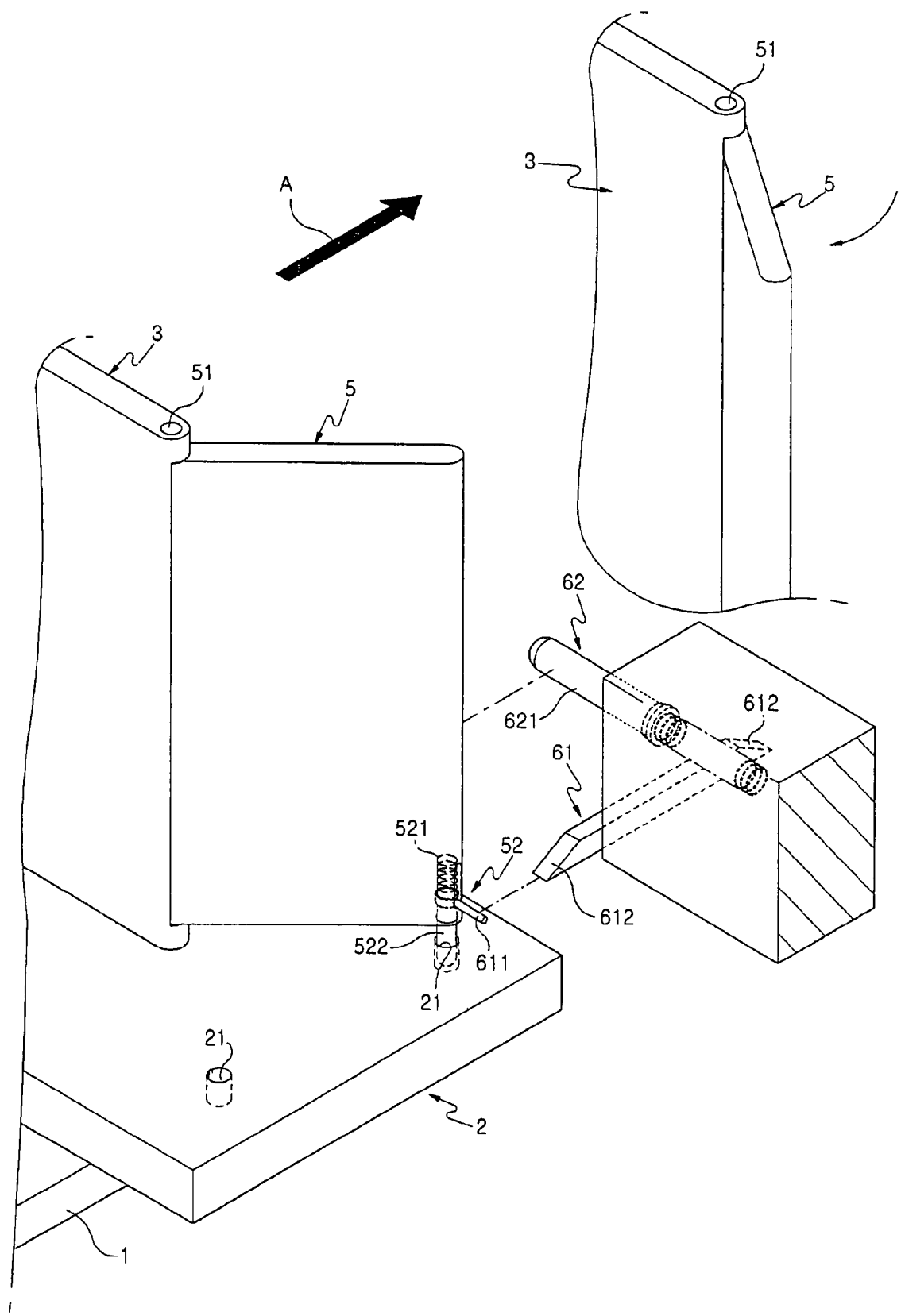
FIG. 3 is a perspective view illustrating a water receiving plate of the hydraulic power generating system in accordance with an exemplary embodiment of the present invention.
Figure 4:
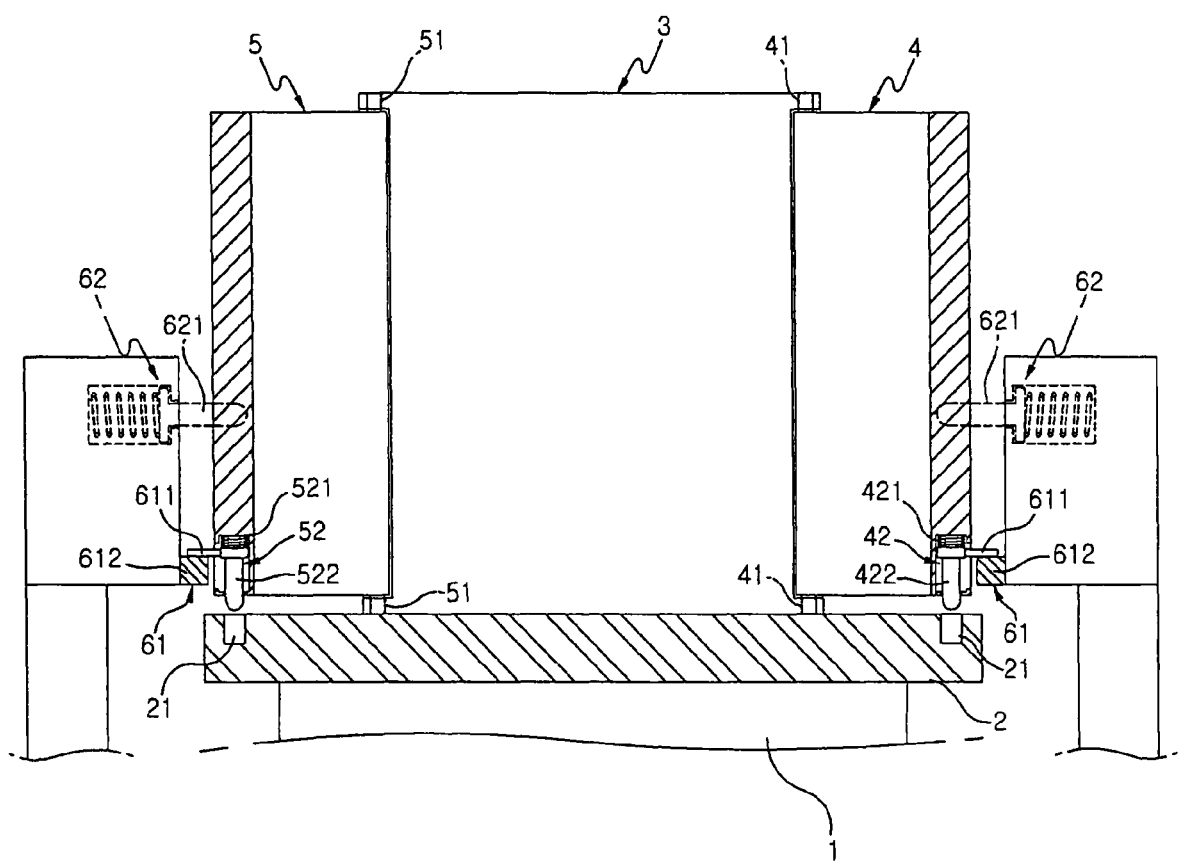
FIG. 4 is a sectional view illustrating a water receiving plate of the hydraulic power generating system in accordance with an exemplary embodiment of the present invention.

In the first embodiment, as shown in FIG. 3, when water flows in the arrow "A" direction, the front end portion of each of the side plates 4 and 5 of the water receiving plate 3 collides against the push bar 621, and pushes the push bar 621 backward against the elastic force of the spring. At the same time, as the push bar 621 contactingly slides on the surface of each of the side plates 4 and 5, the push bar 621 makes each of the side plates 4 and 5 rotate about the hinge shafts 41 and 51, so that the side plates 4 and 5 spread against the direction of water flow to receive a larger amount of water. On the other hand, if the direction of water flow is reversed in the arrow "B" direction, the side plates 4 and 5 of the water receiving plate 3 rotate in the reverse direction by the push bar 621 in the same manner as the above. As described above, the spread direction of the side plates 4 and 5 can be automatically changed according to the direction of water flow so as to receive a larger amount of water.

In the second embodiment, as shown in FIG. 5, when water flows in the arrow "A" direction, the water receiving plate 3 moves along the rails 22 formed on the pulley 2 and the side plates 4 and 5 rotate about the hinge shafts 41 and 51 with respect to the water receiving plate 3 to spread against the direction of water flow (shown by a real line in FIG. 5). On the other hand, if the direction of water flow is reversed in the arrow "B" direction, the water receiving plate 3 moves in the reverse direction along the rails 22 and the side plates 4 and 5 also rotate automatically with respect to the water receiving plate 3 to spread against the direction of water flow (shown by an alternate long and two short dashes line in FIG. 5).

As apparent from the above description, according to the hydraulic power generating system of the present invention, since the spread direction of the side plates of the water receiving plate can be changed automatically according to the direction of water flow, efficiency in generating power using water energy increases. Also, since the side plates spread with respect to the water receiving plate by a predetermined inclination angle, the water receiving plate and the side plates can receive a larger amount of water.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hydraulic power generating system comprising:
   a looped rail;
   a plurality of pulleys moving along said looped rail;
   a plurality of water receiving plates, each being installed with a respective one of said plurality of pulleys;
   side plates which are hingedly coupled to left and right side portions of each of said plurality of water receiving plates by hinge shafts; and
   spread adjusting devices which make said side plates spread against a direction of water flow, each of said spread adjusting devices includes:
   a lock releasing part which releases a locking state of a locking device mounted to each of said side plates; and
   a side plate rotating part which rotates each of said side plates to spread against the direction of water flow;
   said locking device includes a stopper elastically mounted to each of said side plates and insertion holes formed at each of said plurality of pulleys;
   said lock releasing part includes a guide bar formed at said stopper and a guide rail mounted to a fixing frame; and
   said side plate rotating part includes a push bar mounted to said fixing frame and elastically supported by a spring.

* * * * *